United States Patent [19]

Salley et al.

[11] Patent Number: 4,721,167
[45] Date of Patent: Jan. 26, 1988

[54] HITCH FLEXING HINGE

[75] Inventors: Gordon L. Salley, Moline, Ill.; Donald K. Landphair, Bettendorf, Iowa

[73] Assignee: Deere & Company, Moline, Ill.

[21] Appl. No.: 895,755

[22] Filed: Aug. 12, 1986

Related U.S. Application Data

[63] Continuation of Ser. No. 592,627, Mar. 23, 1984, abandoned.

[51] Int. Cl.⁴ ..................... A01B 73/06; A01B 59/042
[52] U.S. Cl. .................................... 172/311; 172/677; 172/776; 403/278
[58] Field of Search ............... 172/311, 310, 677, 776; 280/494, 493, 492, 504, 411 R, 411 A, 412, 413; 403/278, 279

[56] References Cited

U.S. PATENT DOCUMENTS

| | | | |
|---|---|---|---|
| 3,223,179 | 12/1965 | MacKenzie | 172/624 |
| 3,256,942 | 6/1966 | Van Sickle | 172/310 |
| 3,367,678 | 2/1968 | Tonne | 172/311 |
| 3,436,098 | 4/1969 | Orendorff | 180/412 |
| 3,708,018 | 1/1973 | Wilbeck | 172/587 |
| 4,029,155 | 6/1977 | Blair | 172/657 |
| 4,044,842 | 8/1977 | Worick | 172/595 |
| 4,117,893 | 10/1978 | Kincebaw | 172/311 |
| 4,126,187 | 11/1978 | Schreiner | 172/311 |
| 4,137,852 | 2/1979 | Pratt | 111/57 |
| 4,220,350 | 9/1980 | Hatcher | 280/656 |
| 4,260,172 | 4/1981 | Rettig | 280/411 A |
| 4,301,873 | 11/1981 | Baxter | 172/311 |
| 4,318,444 | 3/1982 | Hake | 172/456 |
| 4,319,643 | 3/1982 | Carter | 172/311 |
| 4,355,689 | 10/1982 | Friggstad | 172/311 |

FOREIGN PATENT DOCUMENTS

| | | | |
|---|---|---|---|
| 806935 | 2/1969 | Canada . | |
| 1096225 | 2/1981 | Canada . | |
| 743664 | 6/1980 | U.S.S.R. | 280/411 A |

Primary Examiner—Richard J. Johnson
Attorney, Agent, or Firm—Henderson & Sturm

[57] ABSTRACT

A hitch flexing hinge included within the draft beams of an implement frame of the type that enables vertical flexing of the frame sections. The hinge includes a yoke attached to the drawbar of a draft vehicle and a body section that is received in one end of the draft beam. The body portion carries a swivel ball and attachment of the draft beam to the swivel ball allows rotational twisting of the draft beam about its longitudinal axis as the implement frame sections flex.

16 Claims, 7 Drawing Figures

HITCH FLEXING HINGE

TECHNICAL FIELD

This invention relates to implement frames, and more particularly to implement frames utilizing a horizontal pivot which enables vertical flexing of transverse frame sections.

BACKGROUND ART

The trend to large scale farming operations and the desire to achieve and maintain ever increasing productivity levels has led to various procedures and implements designed to maximize efficient use of labor and equipment. One accepted method of maximizing efficiency is to utilize large scale implements which require extensive frames that can be unfolded to a wide effective working width in the field, and folded to an acceptably narrow configuration for transport from field to field.

Foldable agricultural implement frames are generally of three basic types wherein the sections are folded to the rear, vertically, or to the front. The forward fold configuration is widely favored and an excellent example of the forward folding implement frame is found in U.S. Pat. No. 4,137,852. When the implement frame extends to a great width in the unfolded operational mode, it is desirable to provide for vertical flexing of the frame sections so that the implements attached to the frame will follow the contour of the ground. This vertical flexing is typically provided by a horizontal pivot interconnecting frame sections and disposed in a general fore-and-aft direction when the frame is in the transversely extended operational mode.

One disadvantage of frames providing for vertical flexing is that the draft beams interconnecting the frame sections and the hitch are subjected to twisting or torsional forces that can lead to structural damage or failure.

Those concerned with these and other problems recognize the need for an improved implement frame.

DISCLOSURE OF THE INVENTION

The present invention provides a hitch flexing hinge incorporated within the draft beams of an implement frame in the vicinity of the hitch. The hitch flexing hinge allows for movement of the draft beam within a limited range without subjecting the draft beam to torsional forces. Each hitch flexing hinge includes a yoke that receives a vertical hitch pin and a body section that is received within the end of a rectangular draft tube or beam. The body section has a vertically elongated diamondshaped cross-sectional portion having a socket or race that carries a swivel ball. The ball has a central opening that receives a fastener extending through opposing sidewalls of the draft tube to secure the body section within the draft tube. The draft tube is thus able to rotate about the axis of the swivel ball which is positioned substantially at the longitudinal axis of the draft tube.

An object of the present invention is the provision of an improved implement frame.

Another object is to provide a hitch flexing hinge for use in conjunction with an implement frame capable of vertical flexing of the transverse frame sections.

A further object of the invention is the provision of a hitch flexing hinge that allows for vertical flexing of implement frame sections without damaging or weakening the draft beams.

Still another object is to provide a hitch flexing hinge that can withstand substantial vertical loading.

A still further object of the present invention is the provision of a hitch flexing hinge that is easy and inexpensive to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
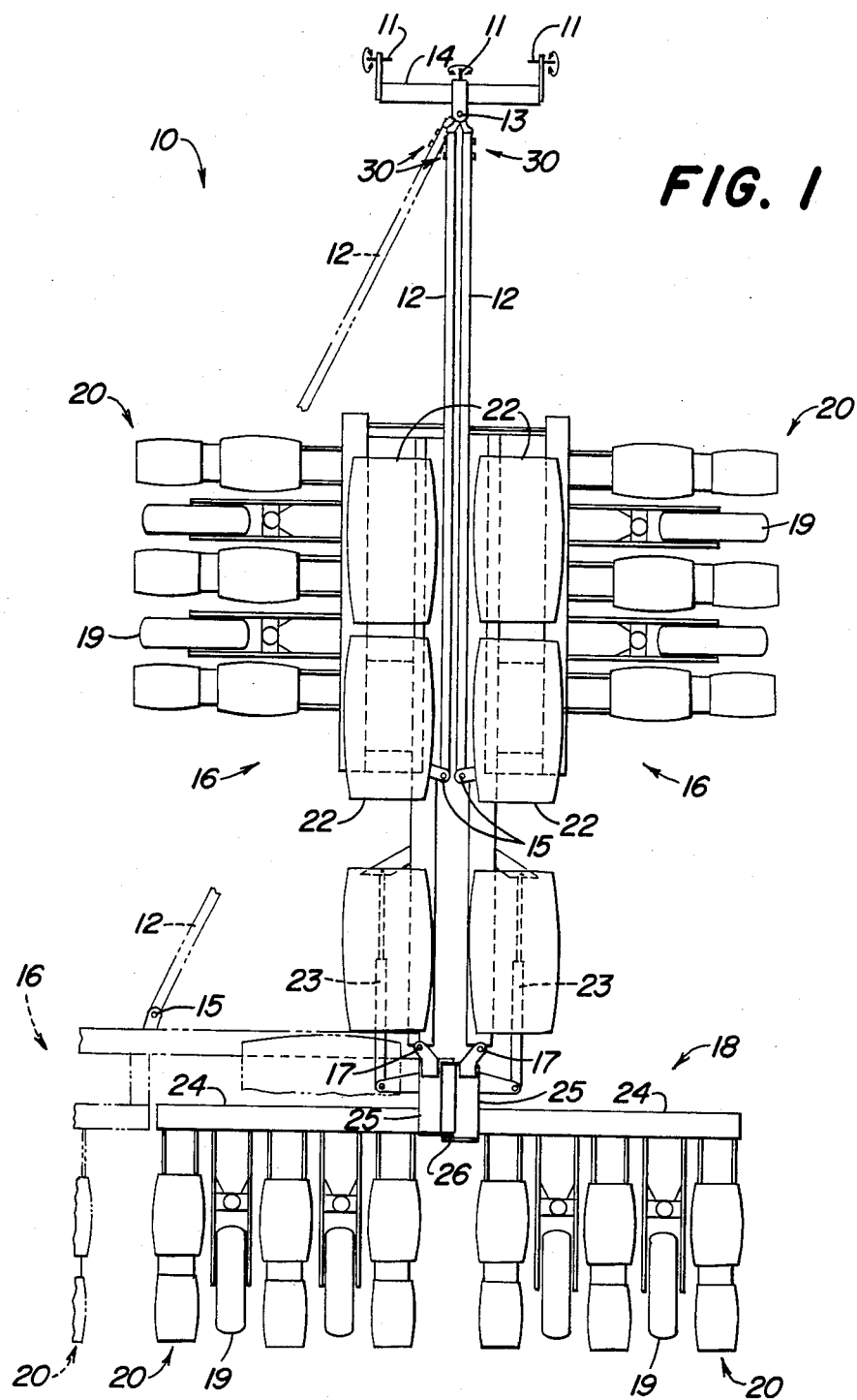
FIG. 1 is a top plan view showing a forwardly folding implement frame having a horizontal pivot which enables vertical flexing of connected transverse frame sections, and having a flexing hinge incorporated in the hitch, the dashed line portion illustrates the frame in the unfolded operational mode.
Figure 2:
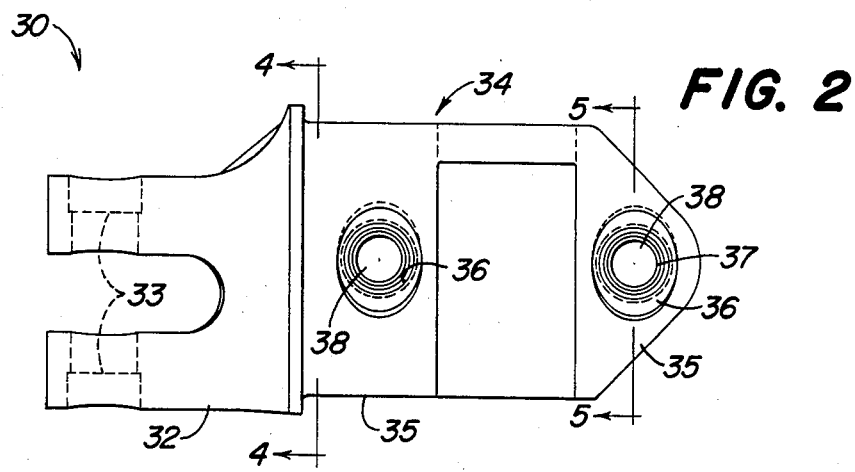
FIG. 2 is a side elevational view of the hitch flexing hinge.
Figure 3:
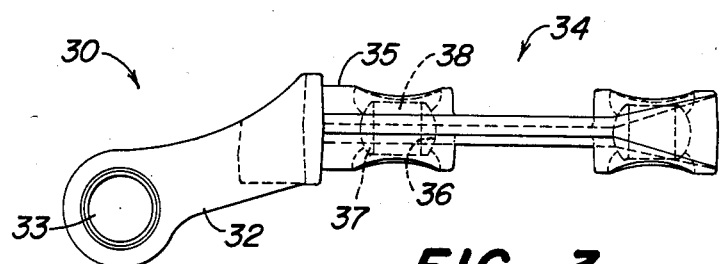
FIG. 3 is a top plan view of the hitch flexing hinge.
Figure 4:
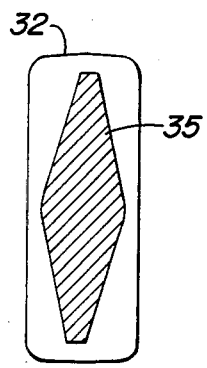
FIG. 4 is a sectional view taken along line 4—4 of FIG. 2.
Figure 5:
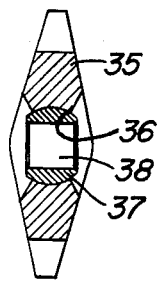
FIG. 5 is a sectional view taken along line 5—5 of FIG. 2.

Referring now to the drawings wherein like reference numerals designate identical or corresponding parts throughout the several views, FIG. 1 shows a forwardly foldable implement frame (10) including a pair of fore-and-aft draft tubes (12) having their forward ends pivotally connected by vertical hitch pin (13) and supported on a hitch structure (14) of a draft vehicle (not shown), and having their rearward ends pivotally attached by vertical pins (15) to right and left wing sections (16). The hitch structure (14) has pivoting joints (11) which allow for universal pivoting of the hitch structure (14) with respect to hitch pin (13). The wing sections (16) are conventionally mirror images of each other and both are pivotally attached by vertical pin (17) to a central frame section (18). As is typical, each of the wing sections (16) and the center section (18) is supported by ground wheels (19) and they may carry any form of agricultural tool such as the planting units (20) and tanks (22) illustrated in FIG. 1.

The frame (10) is moved between the folded transport position, as shown by the full line illustration of FIG. 1, and the unfolded operational position, as partially illustrated by the dashed line portion of FIG. 1, by selective activation of the hydraulic cylinders (23). Retraction of the hydraulic cylinders (23) forces the right and left wing sections (16) to move in an arcuate path about their respective vertical pivots (17) until the wing sections (16) are transversely aligned with the center section (18).

Extending forward from the center section beams (24) are a pair of short fore-and-aft beams (25) that are pivotally interconnected by fore-and-aft horizontal pivot pin (26). The horizontal pivot (26) enables vertical flexing of the wing sections (16) and the associated center beams (24), when the wing sections (16) are transversely extended to the unfolded operational position.

The forward end of the draft beams (12) carries a hitch flexing hinge (30) which allows for limited rotation of the draft beam (12) as wing sections (16) flex to follow the ground contour. As best shown in FIGS. 2-5, the hitch flexing hinge (30) includes a bifurcated offset yoke (32) having registered openings (33) adapted to receive the vertical hitch pin (13). The hitch hinge (30) also includes a body section (34) which is adapted to be received within the end of a rectangular draft beam or tube (12). The body section (34) has two generally diamond-shaped portions (35) that have sockets or races (36) that receive a swivel ball (37) having a central opening (38).

Figure 7:
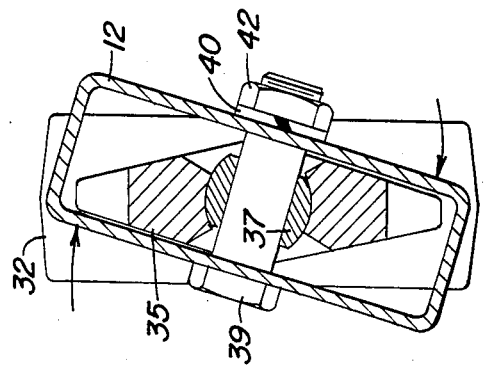
FIG. 7 is a sectional view similar to FIG. 6, but illustrating torsional force applied in a clockwise direction.
Figure 6:
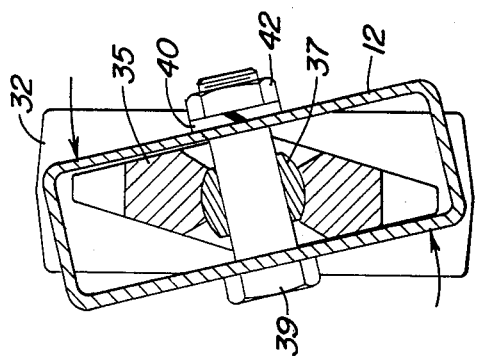
FIG. 6 is a sectional view similar to FIG. 5, and further illustrating the limitation to the range of rotational motion of the draft beam attached to the hitch flexing hinge as torque is applied in a counterclockwise direction.

In use, the body section (34) of a hitch flexing hinge (30) is inserted into the end of a draft beam (12). The central opening (38) of the swivel ball (37) receives a bolt (39) that extends through opposing sidewalls of the draft beam (12) and is secured by lock washer (40) and nut (42). FIGS. 6 and 7.) As shown in FIG. 1, a hinge unit (30) is attached within each of the two draft beams (12). The bifuracted yokes (32) are directed to converge toward one another and the fingers of the yokes (32) interlock so that all openings (33) are in register to receive the hitch pin (13).

When the frame (10) is extended to the unfolded operational position, the horizontal pivot pin (26) allows the vertical flexing of the wing sections (16). As shown in FIGS. 6 and 7, the draft beam (12) rotates a limited distance in both a clockwise and counterclockwise direction as the wing sections (16) flex.

The draft beam (12) is thus able to rotate about the axis of the swivel ball (37) until the inside walls of the draft beam contact the surface of the diamond-shaped portion (35) of the body section (34).

The hitch flexing hinge (30) is oriented within the draft beam (12) such that the opening in the swivel ball (37) is essentially horizontally disposed. This orientation of the ball (37) and race (36) will support substantial vertically directed forces.

Vertical flexing of the frames (10) causes rotation about horizontal pivot pin (26), vertical pins (15), hitch flex hinges (30), vertical hitch pin (13), and universal pivoting joints (11).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. In an implement frame having a pair of a transversely disposed frame sections, a horizontal fore-and-aft pivot interconnecting said frame sections enabling vertical flexing of said frame sections, and a pair of draft beams each having a forward end attached to a drawbar of a draft vehicle and a rearward end attached to one of said frame sections, the improvement comprising:
   a hitch hinge attached to each of said draft beams intermediate said drawbar and a respective frame section, each said hinge including a body section, said body section including means for attaching each said draft beam such that said draft beam is permitted to oscillate and is movable about a longitudinal axis with respect to aid body section, thereby allowing the draft beam to move as the implement frame sections flex; wherein each said draft beam is a tube and said body section of said hinge is received within one end of said tube; and wherein said body section includes a portion having walls disposed to contact the inside walls of said tube as the tube rotates a predetermined distance about a longitudinal axis.

2. The implement frame of claim 1 wherein said pivotal attachment means includes swivel ball journalled for rotation within a race formed in said body section, said ball having an opening therethrough to receive a fastener, which fastener is disposed to connect said draft beam and said ball.

3. The implement frame of claim 2 wherein said pivotal attachment means includes a pair of swivel balls.

4. The implement frame of claim 3 wherein said fastener includes a bolt secured in position with a lock washer and nut.

5. The implement frame of claim 3 wherein the opening in said swivel ball is generally horizontally disposed such that the race is disposed in a vertical plane.

6. The implement frame of claim 2 wherein the opening in said swivel ball is generally horizontally disposed such that the race is disposed in a vertical plane.

7. The implement frame of claim 1 wherein said hinge includes a yoke attached by a vertically disposed hitch pin to said drawbar.

8. The implement frame of claim 7 wherein said yoke is bifurcated and wherein a yoke of a second hitch hinge is disposed to intermesh with said yoke and be interconnected by said hitch pin.

9. The implement frame of claim 8 wherein said yoke is offset from the longiutidinal axis of said draft beam.

10. The implement frame of claim 1 wherein said body section portion is diamond-shaped.

11. In an implement frame having a pair of transversely disposed frame sections, a horizontal fore-and-aft pivot interconnecting said frame sections enabling vertical flexing of said frame sections, and a pair of draft beams each having a forward end attached to a drawbar of a draft vehicle and a rearward end attached to one of said frame sections, the improvement comprising:
   a hitch hinge attached to each of said draft beams intermediate said drawbar and said frame section, each said hinge including an elongated body section, said body section including a horizontally and longitudinally spaced pair of swivel balls each journalled for rotation within a race formed in said body section, each of said balls having an opening therethrough to receive a fastener, which fastener is disposed to connect to a respective one of said draft beams and said balls such that each said draft beam is permitted to oscillate and is movable about a longitudinal axis with respect to said body section, thereby allowing the draft beam to move as the implement frame sections flex; wherein each said draft beam is a tube and said body section of said hinge is received within one end of said tube.

12. The implement frame of claim 11 wherein said hinge includes a yoke attached by a vertically disopsed hitch pin to said drawbar.

13. The implement frame of claim 12 wherein said yoke is bifurcated and wherein a yoke of a second hitch hinge is disposed to intermesh with said yoke and be interconnected by said hitch pin.

14. The implement frame of claim 13 wherein said yoke is offset from the longitudinal axis of said draft beam.

15. The implement frame of claim 11 wherein said body section includes a portion having walls disposed to contact the inside walls of said tube as the tube rotates a predetermined distance about its longitudinal axis.

16. The implement frame of claim 15 wherein said body section portion is diamond-shaped.

* * * * *